United States Patent Office 3,117,999
Patented Jan. 14, 1964

3,117,999
TERT.-CARBINAMINE POLYOXYALKYLENE
SURFACE-ACTIVE AGENTS
Fred E. Boettner, Huntingdon Valley, and Jean Dupré, Levittown, Pa., assignors to Rohm & Haas Company, Philadelphia, Pa., a corporation of Delaware
No Drawing. Filed Aug. 10, 1959, Ser. No. 832,503
13 Claims. (Cl. 260—584)

This invention is concerned with tert.-carbinamine polyoxyalkylene compounds as new compositions of matter. In particular, these compounds, which are non-ionic surface-active agents, are specific amine-oxyethylene-oxypropylene compositions in which it is essential that the oxyethylene group be centrally positioned between the terminal amine and oxypropylene groups.

The compounds of this invention are mono or bis compositions, or vari-proportioned mixtures thereof, which may be represented either by Formula I

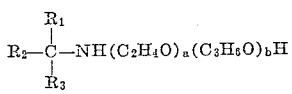

in which $R_1$, $R_2$, and $R_3$ are alkyl groups whose total carbon content ranges from 7 to 23, $a$ is an integer of from 15 to 45, $b$ is a number of from 15 to 67.5, and the relation of $b:a$ is 1:1 to 1.5:1; or Formula II

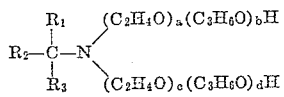

in which $R_1$, $R_2$, and $R_3$ are the same as before, $a+c$ equals an integer of from 15 to 45, $b+d$ equals a number of from 15 to 67.5, and the relation of $(b+d):(a+c)$ is 1:1 to 1.5:1.

In the bis compound of Formula II, $a$ and $c$ may be the same or unequal; $b$ and $d$ also may be the same or unequal numbers. The preferred compositions, whether comprised of Formula I or Formula II, are those in which the sum of $R_1$, $R_2$, and $R_3$ equals a total of from 11 to 14 carbon atoms and $a$ or $(a+c)$ equals 20–35 and $b$ or $(b+d)$ equals 20–45.

The novel compositions hereinabove defined are anhydrous light yellow liquids at room temperature, having rather low freezing points which facilitates distribution thereof into cold alkaline base powders. They are extremely low foaming surfactants which are especially useful in mechanical dishwashing applications. Their principal features are their ability to rinse soils from glassware and dishes so thoroughly that there is relatively little spotting on the items so cleansed, and the ability to defoam aqueous dispersions containing proteinaceous and other types of foam-causing food soils such as eggs, flour, milk, etc.

Our novel compounds are prepared by the reaction of a tert.-carbinamine having the general structural formula

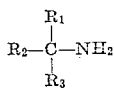

where $R_1$, $R_2$, and $R_3$ have the values given above with 15–45 moles of ethylene oxide, followed by reaction with 15–67.5 moles of propylene oxide. The reaction with ethylene oxide is preferably carried out in two steps, the first in a water-methanol solution from which is formed the monohydroxyethyl derivative

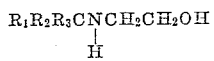

or the bis(hydroxyethyl) derivative having the formula

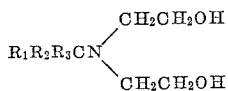

or a mixture of the two possibly containing some unreacted primary amine.

When a mixture is obtained of the mono and bis(hydroxyethyl) derivatives, and some unreacted primary amine, the components may be separated and the mono and bis derivatives reacted separately with additional ethylene oxide. Alternatively, the crude reaction product may be reacted directly with additional ethylene oxide. In either case, base catalysis is employed; and the final mole ratio of ethylene oxide to amine is in the desired range of 15:1 to 45:1. This intermediate mixture is made up principally of tertiary amines of the structure

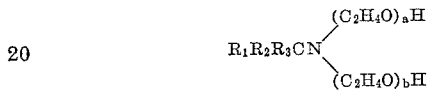

However, if the initial reaction product contains a relatively high proportion of $R_1R_2R_3CNHCH_2CH_2OH$, the product may largely consist of a single polyglycol chain having the structure $R_1R_2R_3CNH(C_2H_4O)_cH$. To either one of the above reaction products, propylene oxide is added and the reaction carried out with base catalysis so that the final product contains an average of 15–67.5 moles of propylene oxide per amino group. The resulting compositions have the structures of either Formula I or Formula II set forth above.

General information concerning the details of reacting the alkylene oxide with the tert.-carbinamine can be obtained by reference to U.S. Patent 2,871,266. However, some notable differences exist between the process disclosed in that patent and the process by which the present compositions may be made. For example, the patent teaches a method of making only a polyoxyalkylene amine characterized by a monolinear chain of oxyalkylene groups. In the present development, the products are polyoxyalkylene amines which may have either a monolinear chain or dilinear chains of oxyalkylene units, or a mixture of the two. The reaction of the alkylene oxide with the tert.-carbinamine can be controlled to give predominantly single or double chain polyglycol derivatives, depending on the starting material and the concentration of the catalyst employed.

Another important distinction of the present invention over the prior art is the fact that the unique products herein disclosed are only obtainable when the ethylene oxide is added first. Addition of the propylene oxide first, or as a mixture with the ethylene oxide, leads to products which are much higher in foaming tendency, and possess substantially no defoaming ability in comparison with the products hereinbelow claimed.

Following are descriptions of the various tests which were used to evaluate the present compositions and which, by comparative evaluation with other surfactants known to the prior art, have proved the superiority of our novel products. The first is a method for testing the degree of foaming tendency; it has been named the "Hamilton-Beach Foam Test" and is performed essentially as follows.

The apparatus consists of a well-known Hamilton-Beach electrically driven mixing apparatus which is inserted into a glass tube (sealed at the bottom end). In the tube are four stainless steel baffle plates held vertically. The glass tube is immersed in a water bath which maintains the temperature within 0.5° C. of the particular test temperatures (in this case, 50° C.). The mixer blades are centered in the tube with the upper blade ½ inch above the solution surface. The 200 ml. of 0.1% test solution is equilibrated to temperature and then mixed at high speed (14,500 r.p.m.) for 3 minutes. The mixer is stopped and the foam height recorded after 15 seconds. A foam height of less than 5.5 cm. is considered acceptable, and anything over that value is deemed unacceptable. Each test is usually run in duplicate.

The spotting test employed is of a type used throughout industry. It involves putting five clean 10-ounce test drinking glasses and 10 load glasses through successive, complete cycles in a "Kitchen Aid" home-type of dishwasher. The glasses are placed on the top rack and the bottom rack is loaded with six 9-inch dinner plates smeared with a total of 60 grams of a "standard" soil (made from four parts of oleomargarine and one part of powdered milk). Eight unsoiled 6-inch salad plates are also placed on the bottom rack. All plates and glasses are maintained in specific positions from test to test. Forty grams of detergent formulation (0.45%) are added to each wash cycle (5 minute wash and two 1-minute rinses) with 2⅓ gallons of 250 p.p.m. hard water at 52°–57° C. followed by a 25-minute hot air drying period.

Evaluation of the results of the spotting test consists in counting spots more than ⅛ inch in diameter, observing any haze or soil deposition, and noting over-all general appearance. The examination of the 5 test glasses is made under a fluorescent light source in a dark cabinet. The described procedure constitutes one cycle. Each detergent is tested for 10 cycles (one run) using the same five glasses without additional cleaning between cycles. The test glasses are revolved a quarter turn and rotated one position in the rack after each cycle to insure equal treatment for each test glass. When care is exercised to maintain fairly uniform all variables such as the precleaning of glasses, water temperature, preparation of soil, method of addition of detergent, etc., satisfactorily reproducible results are obtained. A detergent which leaves no more than 500 spots in this test after 10 cycles is considered satisfactory, and any larger number of spots would label the detergent as unsatisfactory. Also, a detergent which causes noticeable filming due to deposited soil or hard water salts is considered unsatisfactory. Normally, the material being tested is incorporated in an alkaline base which typically could be made up of about 35% sodium tripolyphosphate, 45% sodium metasilicate pentahydrate and 20% soda ash.

The ability of surfactants to defoam food soils in another important requirement of surfactants which are primarily intended for use in apparatus for washing dishes and the like. The presence of any air in the water spray employed in such machines reduces the mechanical efficiency thereof by decreasing the impact of the spray on the substrates. A spray of lower force than that which the machine is designed to apply would not be as effective in removing food particles. Serious foaming problems are caused by proteinaceous foods such as egg, milk, and flour, which cause relatively large quantities of air to be trapped in the water spray. At higher concentrations, foam may also be caused by fatty or oily soils. The effectiveness of a surfactant in minimizing the foam caused by food soils apparently depends upon the same characteristics which make those compositions highly useful in preventing spotting and filming on dishes and the like, because a rough correlation of the two with regard to their effectiveness can be drawn quite readily.

The food soil defoaming test is performed with a dishwasher, such as the commercially well-known Kitchen Aid apparatus, in which the speed of the rotor is a function of the quantity and character of foam. Foam pumped into the rotor imparts less momentum to the rotor upon leaving than would water without air and hence the rotor moves slower.

The detergent containing the surfactant under test is added to the machine, and the machine is allowed to fill. When the spray begins, the machine is momentarily stopped, beaten whole fresh egg or other soil is added, and then the spray is allowed to continue. After 2, 3, and 4 minutes, the revolutions of the spray rotor are counted over a 30-second period. The reported r.p.m. number is the average of these three determinations. For the prepared food soil whose composition is described in Table I below, this number must be at least 95 for the surfactant to be acceptable. For egg, flour and milk, 45 is considered satisfactory at the specified concentrations of surfactant.

In Table I which follows, data is set forth which shows the performance of our novel compositions in the aforementioned foam and spotting tests and the test which measures the ability of surfactants to defoam food soils. All of the compositions above the horizontal dotted line, namely, compounds Nos. 1–11, are in accordance with

TABLE 1

| | Surfactant composition | Hamilton-Beach foam test, 0.1–15 sec./50° C. | Defoaming of food soils kitchen aid, r.p.m. at 52°–57° C. | | | | Spotting test [1] |
|---|---|---|---|---|---|---|---|
| | | | Prepared food soil [1] | Egg [2] | Flour [2] | Milk [3] | |
| 1 | t-Amine $E_{15}P_{15}$* | 0.0 | 101 | 46 | 45 | 47 | Satisfactory. |
| 2 | t-Amine $E_{15}P_{20}$ | 0.0 | 95 | | | | Do. |
| 3 | t-Amine $E_{15}P_{20}$ a | | 107 | | | | Do. |
| 4 | t-Amine $E_{15}P_{20}$ b | | 95 | | | | Do. |
| 5 | t-Amine $E_{20}P_{20}$ | 0.0 | 108 | 71 | 68 | 73 | Good. |
| 6 | t-Amine $E_{20}P_{30}$ | 0.0 | 104 | 72 | | | Do. |
| 7 | t-Amine $E_{25}P_{25}$ | 0.0 | 106 | | | | Do. |
| 8 | t-Amine $E_{35}P_{25}$ | 0.1 | 108 | 75 | | | Do. |
| 9 | t-Amine $E_{35}P_{45}$ | 0.0 | 105 | 93 | 91 | 86 | Do. |
| 10 | t-Amine $E_{35}P_{52.5}$ | 1.8 | 102 | 93 | | | Do. |
| 11 | t-Amine $E_{45}P_{67.5}$ | 1.6 | 106 | 91 | 93 | 70 | Satisfactory. |
| 12 | t-Amine $E_{8.4}P_{9.3}$ | | 73 | | | | Unsatisfactory. |
| 13 | t-Amine $E_{12.5}P_{12}$ | | 91 | 38 | 37 | 44 | Satisfactory. |
| 14 | t-Amine $E_{60}P_{80}$ | | 100 | 83 | | | Unsatisfactory. |
| 15 | t-Amine $P_{19}E_{20}$ | 11.0 | | 18 | | | |
| 16 | E–P block copolymers c | 1.0 | 58 | 28 | 39 | 40 | Do. |

*t-amine = the t-carbinamine polyoxyalkylene of Formulas I or II above (E = oxyethylene and P = oxypropylene).
a Primarily monolinear structure.
b Primarily dilinear structure.
c A commercial product made up of block copolymers of ethylene oxide and propylene oxide containing approximately 9 parts of $E_5P_{30}E_5$ units and 1 part of $E_2P_{30}E_2$.
[1] Soil used consists of 0.67% (60 gm.) of a soil made from 4 parts by weight of oleomargarine to 1 part by weight of powdered milk, and 0.45% (40 gm.) detergent consisting of 2% surfactant and an alkaline base made up of about 34% sodium tripolyphosphate, 43% sodium silicate pentahydrate, and 23% soda ash.
[2] 0.11% (10 gm.) whole egg or flour, 0.30% (27 gm.) of a detergent consisting of 1.25% surfactant and the alkaline base described in note (1) above.
[3] 0.22% (20 gm.) dry milk, 0.30% (27 gm.) of a detergent consisting of 0.67% surfactant and the alkaline base described in note (1) above.

the present invention as herein defined and claimed. All of these compositions, it will be noted, proved acceptable in each of the said tests. By comparison, the compounds listed below the horizontal dotted line, namely, Nos. 12–15, are for one reason or another outside the teachings of the present invention and they are all unsatisfactory. Compounds 12 and 13, for example, have oxyethylene and oxypropylene contents below the specified minimum. Correspondingly, the performance of compound No. 12 has been unsatisfactory in the spotting test and in its ability to defoam liquids containing either egg or the specially prepared food soil. Compound No. 13 similarly has been unsatisfactory with regard to its defoaming ability, although it passes the spotting test. Compound No. 14, which contains oxyethylene and oxypropylene in excess of the specified limits was unsatisfactory in the spotting test. Compound No. 15, in which the oxypropylene is positioned centrally and the oxyethylene is one of the terminal groups, also performed unsatisfactorily, both in the Hamilton-Beach foam test and in the defoaming of egg test. Compare No. 16, which is representative of a well-known commercial ethylene oxide-propylene oxide surfactant having an oxypropylene group as the hydrophobic group; it behaved poorly in the spotting and defoaming tests although it is acceptable from the standpoint of its low foaming tendency.

The tert.-carbinamines which may be used in the preparation of the present compounds are any of the commercially available N-tertiary alkyl amines having a total of 8 to 24 carbon atoms. They may be those which are composed primarily of a single entity, or those which are mainly a mixture of isomers, homologs, or both. As typical examples, there may be cited tert.-octyl primary amine, 2-amino-2,4,4-trimethylpentane, and a tert.-tridecyl primary amine, iso $C_8H_{17}(C_2H_5)_2CNH_2$. Also commercially available are mixtures of tert.-alkyl primary amines, such as $C_{12}H_{25}NH_2$ to $C_{15}H_{31}NH_2$ and $C_{18}H_{37}NH_2$ to $C_{24}H_{49}NH_2$, these being derived from hydrocarbon fractions of such sizes. These tert.-carbinamines may be represented by the formula

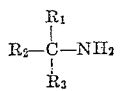

in which $R_1$, $R_2$, and $R_3$ have the significance previously set forth. The smallest tert.-carbinamine reactant is an octyl amine and the largest, a tetracosyl amine, as will be apparent to those skilled in the art.

The preparation of the polyoxyalkylated tert.-alkyl amines of the present invention, which were generally described above and illustrated by Formulas I and II, will be more fully understood from the following illustrative examples, wherein parts by weight are used throughout.

*Example Ia*

Five hundred grams of a commercial mixture of 12-carbon to 15-carbon tert.-carbinamines, containing mainly tert.-$C_{12}H_{25}NH_2$ and having a neutral equivalent of 196, were charged to a 2-liter stainless steel autoclave equipped with a heater, a stirrer, a pressure gauge, and an inlet tube. A small cylinder for ethylene oxide was connected to the inlet tube through a valve.

One hundred fifty-eight grams of methanol and 46 g. of water were charged to the autoclave, which was then sealed. Stirring was started, and the temperature was raised to 80° C. The small cylinder was charged with 330 g. of ethylene oxide and connected to the inlet tube. The small cylinder was heated in a warm water bath so as to maintain a gauge pressure of 20 to 30 lbs./sq. in.

The autoclave was vented once to remove air. The valve to the cylinder was then opened, allowing ethylene oxide to flow into the autoclave. The rate of ethylene oxide addition was adjusted so as to maintain a pressure in the autoclave of 10 to 20 lbs./sq. in. and a temperature of 80°–85° C. It was necessary to cool the autoclave during this addition. After 2 hours, all the ethylene oxide had been added. The valve to the cylinder was then closed, and heating at 80°–85° C. was continued for 2 hours. At the end of this time, the autoclave was cooled to room temperature and vented to atmospheric pressure. The autoclave was opened and its contents transferred to a distillation flask. Methanol and water were removed at reduced pressure until no more distillate came over at a temperature of 100° C. at an absolute pressure corresponding to 15 mm. of mercury. The product was then cooled to room temperature and filtered. It was a light amber oil weighing 825 g. The neutral equivalent was 253. This product was a mixture of the mono and bis-hydroxyethyl t-alkyl carbinamines.

*Example Ib*

Three hundred parts of the product from Example Ia were distilled under vacuum using a fractionating column 20 cm. high and 1.25 cm. in diameter packed with glass helices. A fraction of 94 parts by weight boiling at 88°–103° C. at 0.25 mm. of mercury pressure was substantially pure t-$C_{12}H_{25}NHCH_2CH_2OH$. This product had a neutral equivalent of 238 (theory: 230) and a refractive index ($n_D^{26}$) of 1.4630.

*Example Ic*

The distillation in Example Ib was continued. After taking several intermediate cuts, a fraction boiling at 145°–150° C. at 0.1 mm. of Hg pressure was taken. This amounted to 120 parts by weight and was substantially pure t-$C_{12}H_{25}N(CH_2CH_2OH)_2$. Neutral equivalent was 278 (theory: 274) and refractive index ($n_D^{26}$) was 1.4730.

*Example II*

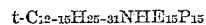

Two hundred fifty-three parts (1 molar equivalent) of the product from Example Ia were mixed with 2.0 parts of flake sodium hydroxide and warmed to 130° C. under $N_2$. The apparatus was vented three times with nitrogen and a slow stream of ethylene oxide was passed in. Temperature was allowed to rise to 150–180° C. When 603 parts of ethylene oxide had been taken up, as measured by weight gain, the flow of ethylene oxide was stopped, and addition of propylene oxide was begun. Addition of propylene oxide was continued at 140°–150° C. until 870 parts had been taken up, as measured by weight gain.

The product was then cooled and the catalyst neutralized by addition of 12.2 parts of 20% sulfuric acid. Product was stripped to remove water and was then filtered through a pad of diatomaceous earth. Product was a pale amber, water-soluble liquid. A 1% solution in water was clear below 24° C. but became turbid above this temperature.

*Example III*

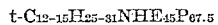

The procedure in Example II was followed, except that 5.6 parts of potassium hydroxide was used as catalyst. The addition of ethylene oxide was continued until 1923 parts by weight of ethylene oxide had been taken up. The subsequent reaction of propylene oxide was continued until 3918 parts by weight of propylene oxide had been taken up. Neutralization was carried out with 9.8 parts of 50% $H_2SO_4$. The product had a cloud point of 25° C. at 1% in water.

*Example IV*

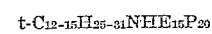

The procedure of Example II was followed except that 238 parts of distilled product like that from Example Ib was used. The weight of ethylene oxide added was 616 parts and the weight of propylene oxide 1160 parts. The product had a cloud point of 16° C. at 1% in water.

Example V

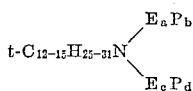

Starting with 278 parts of distilled material like that obtained in Example Ic, the procedure of Example IV was followed. The resulting product was

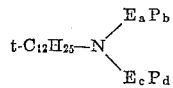

in which $a+c=16$ and $b+d=20$.

Example VI

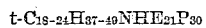

Six hundred parts (2 molar parts by weight of analysis) of a commercial mixture of tert.-carbinamines in the 18 to 24 carbon range was mixed with 36 parts of water and 500 parts of isopropyl alcohol and treated with 106 parts (2.4 molar parts) of ethylene oxide in an autoclave as described in Example Ia. The product after stripping amounted to 700 parts by weight.

Seventy parts of the product (0.2 molar equivalents) and 0.8 part NaOH were reacted with 176 parts of ethylene oxide and 348 parts of propylene oxide by a procedure similar to that described in Example II. The product gave a faintly hazy solution at temperatures below 30° C. and was strongly turbid above 30° C.

Example VII

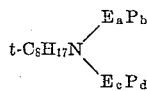

A mixture of 600 parts of 2-amino-2,4,4-trimethylpentane, 80 parts of water, and 280 parts of methanol was treated with ethylene oxide as described in Example Ia until 368 parts had been absorbed. The product was then stripped to remove water and methanol and was then distilled through a fractionating column.

The following fractions were collected:

| Fraction | Compound | Parts by weight | Boiling range, (° C./mm.) | Neutral equivalent Found | Neutral equivalent Theory |
|---|---|---|---|---|---|
| A | $t\text{-}C_8H_{17}NHCH_2CH_2OH$ | 131 | 66–92/0.5 | 179 | 179 |
| B | $t\text{-}C_8H_{17}N(CH_2CH_2OH)_2$ | 796 | 122–125/0.25 | 219 | 223 |

Fraction A was a liquid with refractive index $n_D^{25}$ of 1.4580. Fraction B was a solid melting at 50°–51° C.

Fraction B (219 parts) was further reacted with 1540 parts of ethylene oxide and 2030 parts of propylene oxide by the procedure shown in Example II. The resulting product was

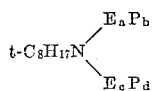

in which $a+c=35$ and $b+d=45$.

Example VIII

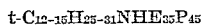

The procedure in Example II was followed, except that 5.6 parts of potassium hydroxide was used as a catalyst, together with 253 parts of the product from Example Ia, 1483 parts of ethylene oxide, and 2610 parts of propylene oxide. The resulting product was

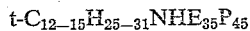

which has a cloud point at 1% in water of 21.5° C.

Other uses for the present compositions, besides the principal use in mechanical dishwashing described above, will suggest themselves to those skilled in the art. For example, in conjunction with alkaline builders, the present compositions have proved effective in removing oil from steel surfaces. Because of their extremely low foaming tendencies, this property makes the present invention particularly attractive for use in spray alkaline metal cleaning. Other areas of application include any operation where the general defoaming ability of these materials could be utilized to advantage, such as in connection with protein solutions, boiler feed water, solutions of other surfactants, resinous coating compositions, etc.

We claim:

1. A composition of matter having the formula

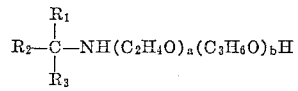

in which $R_1$, $R_2$, and $R_3$ are alkyl groups whose total carbon content ranges from 7 to 23, $a$ is an integer of from 15 to 45, $b$ is a number in the range of 15 to 67.5, and the relationship of $b:a$ is 1:1 to 1.5:1.

2. A composition of matter having the formula

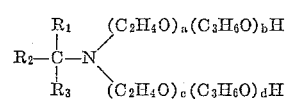

in which $R_1$, $R_2$, and $R_3$ are alkyl groups whose total carbon content ranges from 7 to 23, $a$ and $c$ are any numbers whose sum equals an integer of from 15 to 45, $b$ and $d$ are any numbers whose sum is in the range of from 15 to 67.5, and the relationship of $(b+d):(a+c)$ is 1:1 to 1.5:1.

3. A composition of matter having the formula

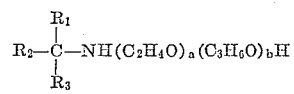

in which $R_1$, $R_2$, and $R_3$ are alkyl groups whose total carbon content ranges from 11 to 14, $a$ is an integer of from 20 to 35, $b$ is an integer of from 20 to 45, and the relation of $b:a$ is 1:1 to 1.5:1.

4. A composition of matter having the formula

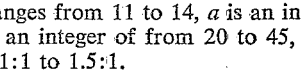

in which $R_1$, $R_2$, and $R_3$ are alkyl groups whose total carbon content ranges from 11 to 14, $a$ and $c$ are any numbers whose sum equals an integer of from 20 to 35, and $b$ and $d$ are any numbers whose sum equals an integer of from 20 to 45, and the relation $(b+d):(a+c)$ is 1:1 to 1.5:1.

5. A composition of matter comprising a mixture of a first compound having the formula

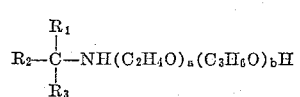

and a second compound having the formula

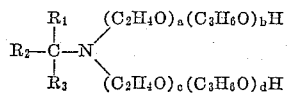

in which $R_1$, $R_2$, and $R_3$ are alkyl groups whose total carbon content in either compound ranges from 7 to 23, $a$ in either compound is an integer in the range of 15 to 45, $b$ in either compound is a number in the range of 15 to 67.5, the sum of $a+c$ in the second compound equals an integer in the range of 15 to 45, the sum of $b+d$ in the second compound equals a number in the range of 15 to 67.5, and the relation of $b:a$ in the first compound and the relation of $(b+a):(a+c)$ in the second compound are 1:1 to 1.5:1.

6. The composition of claim 5 in which $R_1$, $R_2$, and $R_3$ are alkyl groups whose total carbon content ranges from 11 to 14, $a$ is an integer of from 20 to 35, $b$ is an integer of from 20 to 45, the sum of $a+c$ is an integer of from 20 to 35, and the sum of $b+d$ is an integer of from 20 to 45.

7. $t\text{-}C_nH_{2n+1}NH(C_2H_4O)_{15}(C_3H_6O)_{15}H$ where $n$ is an integer from 12 to 15 inclusive.

8. $t\text{-}C_nH_{2n+1}NH(C_2H_4O)_{15}(C_3H_6O)_{20}H$ where $n$ is an integer from 12 to 15 inclusive.

9. $t\text{-}C_nH_{2n+1}NH(C_2H_4O)_{20}(C_3H_6O)_{30}H$ where $n$ is an integer from 18 to 24 inclusive.

10. $t\text{-}C_nH_{2n+1}NH(C_2H_4O)_{45}(C_3H_6O)_{67.5}H$ where $n$ is an integer from 12 to 15 inclusive.

11. $t\text{-}C_8H_{17}N[(C_2H_4O)_{17.5}(C_3H_6O)_{22.5}H]_2$.

12. $t\text{-}C_nH_{2n+1}N[(C_2H_4O)_{17.5}(C_3H_6O)_{22.5}H]_2$ where $n$ is an integer from 12 to 15 inclusive.

13. $t\text{-}C_nH_{2n+1}NH(C_2H_4O)_{35}(C_3H_6O)_{45}H$ where $n$ is an integer from 12 to 15, inclusive.

References Cited in the file of this patent

UNITED STATES PATENTS

| | | |
|---|---|---|
| 2,673,882 | Griffin | Mar. 30, 1954 |
| 2,674,619 | Lundsted | Apr. 6, 1954 |
| 2,871,266 | Riley | Jan. 27, 1959 |

FOREIGN PATENTS

| | | |
|---|---|---|
| 538,842 | Canada | Mar. 26, 1957 |
| 538,843 | Canada | May 26, 1957 |
| 754,679 | Great Britain | Aug. 8, 1956 |